United States Patent
Hung

(10) Patent No.: US 7,366,852 B2
(45) Date of Patent: Apr. 29, 2008

(54) METHOD FOR IMPROVING DATA READING PERFORMANCE AND STORAGE SYSTEM FOR PERFORMING THE SAME

(75) Inventor: Ching-Hai Hung, Yonghe (TW)

(73) Assignee: Infortrend Technology, Inc., Taipei Hsien (TW)

(*) Notice: Subject to any disclaimer, the term of this patent is extended or adjusted under 35 U.S.C. 154(b) by 213 days.

(21) Appl. No.: 11/190,915

(22) Filed: Jul. 28, 2005

(65) Prior Publication Data

US 2006/0026347 A1    Feb. 2, 2006

Related U.S. Application Data

(60) Provisional application No. 60/521,970, filed on Jul. 29, 2004.

(51) Int. Cl.
*G06F 12/00* (2006.01)

(52) U.S. Cl. ........................ 711/154; 711/114

(58) Field of Classification Search ............... 711/114, 711/154; 714/6; 707/204
See application file for complete search history.

(56) References Cited

U.S. PATENT DOCUMENTS

| | | | | |
|---|---|---|---|---|
| 6,321,345 | B1* | 11/2001 | Mann et al. | 714/6 |
| 6,799,283 | B1* | 9/2004 | Tamai et al. | 714/6 |
| 2003/0212858 | A1 | 11/2003 | Apperley et al. | |

* cited by examiner

*Primary Examiner*—Hiep T. Nguyen

(57) ABSTRACT

The present inveniton provides a method for improving data reading performance and a controller performing the same. After a read request is sent to a storage device, the processing time of the read request starts to be counted. If the read request does not successfully read data in a predetermined time period, redundant data identical to the read data is generated in order to achieve the action of reading data. The read request process is still ongoing while generating the redundant data. When the data is read or generated successfully by either of the read request process or the redundant data generating process, the data is returned to a request unit.

42 Claims, 8 Drawing Sheets

METHOD FOR IMPROVING DATA READING PERFORMANCE AND STORAGE SYSTEM FOR PERFORMING THE SAME

RELATED APPLICATIONS

This application claims priority to provisional patent application Ser. No. 60/521,970, filed Jul. 29, 2004, and entitled "Method for Improving Data Reading Performance and Controller, Storage Subsystem and Storage System Performing the Same", which application is incorporated herein by reference.

FIELD OF THE INVENTION

The present invention is related to a stored data reading technology, and more particularly to a method for improving data reading performance and a storage system for performing the same.

BACKGROUND OF THE INVENTION

Computers have become increasingly more popular as people depend more and more on computers to facilitate their daily work. In so doing, much data is generated by the computers. The data typically is stored in a storage device, such as a tape, disc or disk drive, CD-R/W, digital versatile disc (DVD) and so on. However, when the data is stored in the storage device for a long time, because of the inherent limitations of the storage device, such as its lifetime, or because of users' improper operations, such as incorrect electrical connection, the data may become unreadable or it may cause an exhaustive read time. Such situations reduce the reading performance.

FIG. 1 illustrates a schematic drawing of a typical data reading system, in which disks are used to store data. This system includes a host 11 and disks D1, D2, D3 and D4. When the data D21 stored in the disk D2 is read by the host 11, some problems might occur in disk D2, such as a media error, to prevent the data D21 from being sent back to the host 11 for a period of time. Such a condition makes the whole system stop for a certain time. For example, when a video display system needs to read some image data from a storage device for image display, if the condition described in the foregoing occurs, the image might fail to display for a few seconds until the image data is successfully read again or being skipped, and then the next image data will be able to be shown on the screen.

U.S. Pat. No. 5,758,057 has disclosed a method to solve the foregoing problem. This method is to automatically generate a redundant data identical to the required data after the read request has been sent to the storage device for certain duration.

However, the method above cannot solve some current problems. For example, if a previous read request has existed in the target storage device and it cannot be completed in a short time, according to the prior art, its corresponding storage device(s), other than the target storage device, is (are) then commanded to generate redundant data identical to the required data. However, if any other uncompleted read request already exists in at least one of the corresponding storage device(s), the previous uncompleted read request in the corresponding storage device(s) still has to be completed first before generating the redundant data. Such a prior processing method may require much more time to rebuild the redundant data identical to the required data. Moreover, the additional request sent to the corresponding storage device(s) may adversely worsen its reading efficiency owing to too much redundancy reading.

Therefore, it is becoming an important issue of developing a reading method and system to improve the reading efficiency.

SUMMARY OF THE INVENTION

Therefore, the main object of the present invention is to provide a method to improve data reading performance and a storage system for performing the same.

The present invention, according to one feature thereof, provides a method to improve data reading performance that comprises the following steps: sending a first read request for reading first data stored in a target storage device; determining whether the first read request is completed in a first predetermined time period or not; generating first redundant data identical to the first data if the first read request is not completed in the first predetermined time period; and returning the first redundant data to a request unit if the first redundant data is generated while the reading process of the first data is not finished yet, or returning the first data to the request unit if the first read request successfully reads the first data before the first redundant data is generated.

The present invention, according to one feature thereof, provides a method to improve data reading performance which is applied in a RAID system with multi-parities. The method comprises the following steps: sending a first read request for reading first data stored in a target storage device; determining whether the first read request is completed in a first predetermined time period or not; and generating first redundant data identical to the first data if the first read request is not completed in the first predetermined time period and the first redundant data is provided to return to a request unit; wherein, the RAID system has multi-parity such that not all of the related data in the other related storage devices other than the target storage device are required when generating the first redundant data.

The present invention, according to one feature thereof, provides a method to improve data reading performance that comprises the following steps: sending a first read request for reading first data stored in a target storage device; determining whether the first read request is completed in a first predetermined time period or not; determining whether there is an uncompleted timeout read request existing in other storage devices which contain data related to the regeneration of the first data and needed to be read if the first read request is not completed in the first predetermined time period; and generating first redundant data identical to the first data after waiting until no uncompleted timeout read request exists in the other storage devices if there is an uncompleted timeout read request existing in the other storage devices, or generating the first redundant data identical to the first data without waiting if there is no uncompleted timeout read request existing in the other storage devices, and the first redundant data is provided to return to a request unit.

The present invention, according to one feature thereof, provides a storage system possessed of a controller. The controller is connected to a point between a request unit and a plurality of storage devices. The controller sends out a first read request to a storage device storing first data according to a read request from the request unit. The controller comprises a redundant data generation unit which generates first redundant data identical to the first data if the first read request is not completed in a first predetermined time period;

meanwhile the first read request keeps reading the first data. The controller returns either the first redundant data or the first data which is finished first and earliest from the generation of the first redundant data or the reading of the first read request.

BRIEF DESCRIPTION OF THE DRAWINGS

The foregoing aspects and many of the attendant advantages of this invention will become more readily appreciated and better understood by referencing the following detailed description, when taken in conjunction with the accompanying drawings, wherein.

DETAILED DESCRIPTION OF THE PREFERRED EMBODIMENT

Figure 1:
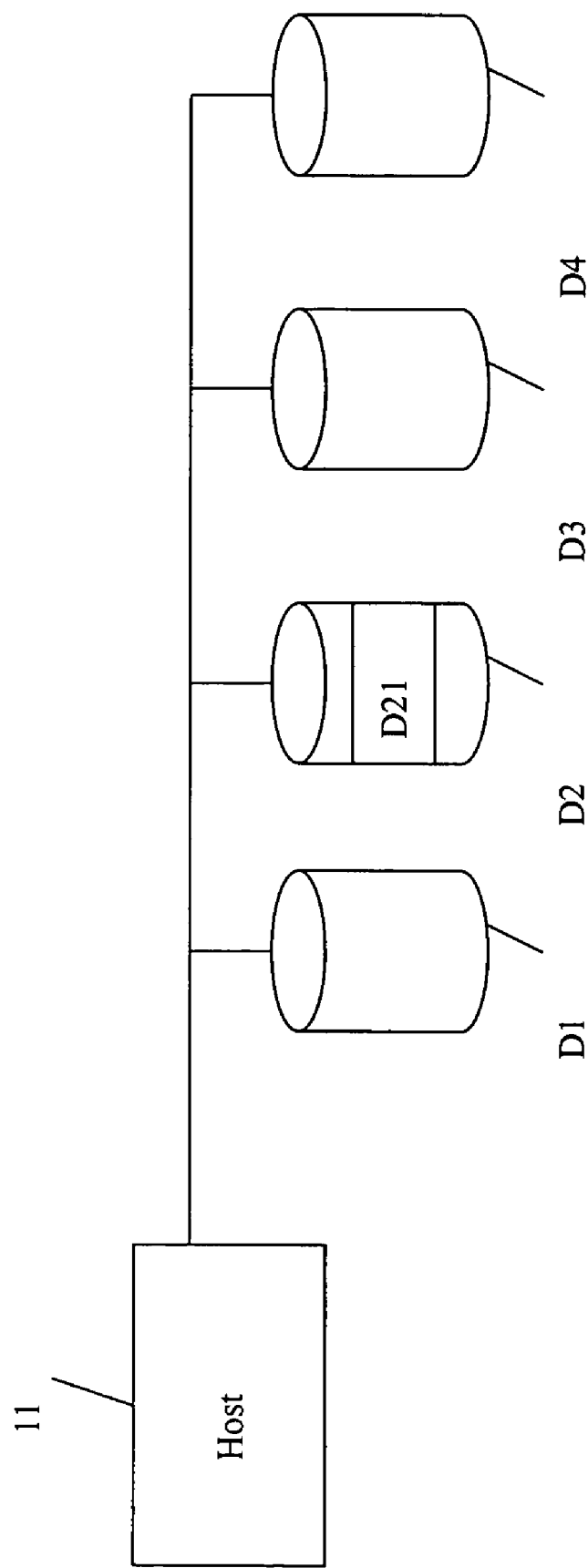
FIG. 1 is a schematic drawing of typical data reading in the prior art.

The method and the storage system disclosed in the present invention can help solving the problem of no responses returned from the storage devices while reading data. The storage device can be a tape, a disk drive, a memory, an optical storage media, such as a CD-R/W or digital versatile disc (DVD), or other equivalent storage devices. In other words, the storage devices in the present invention have the following characteristic: within a plurality of storage devices in which the data stored therein have a mutual redundant relationship, one reading failure occurring on a storage device does not cause the other reading failure on the other storage device(s).

According to the present invention, if a read request cannot be completed after it is sent to a target storage device and a predetermined time is passed, a redundant data identical to the required data will be generated, or regenerated, by the other storage devices with data related to the required data; wherein the read request sent to the target storage device and the generation of the redundant data can be performed simultaneously. If one of the two processes mentioned above finishes first, the read required data or generated redundant data finished by one of the two processes will be sent to the requested application unit, and the other unfinished process will be aborted to avoid redundant read I/O requests which may reduce the normal reading speed. For example, if the read request sent to the target storage device is completed first, the generating redundant data process will be aborted. On the other hand, if the generating redundant data process is completed prior to the original read request sent to the target storage device, the read request would be aborted. However, in some embodiments, the storage devices cannot abort I/O requests so that it become necessary to wait for the I/O requests to be completed.

The method of the present invention avoids too many redundant read processes by aborting read requests. For example, some storage devices cannot receive too many read requests at a time, but application I/O request units may send a lot at the same time. Hence, some read requests sent out from the application I/O request units might not be able to be received by the storage devices mentioned above. Therefore, the read requests that cannot be sent to the storage devices at the time will be, first, moved to a memory with an arrangement of a first-in-first-out (FIFO) sequence, or other possible sequence types, until the storage devices are available to accept the read requests, and the read requests stored in the FIFO memory will then be sent to the storage devices. Thus, one thing only needed for aborting the temporarily stored read requests is to cancel the read requests stored in the memory while wanted to.

A determining step is performed before generating the redundant data identical to the required data according to the present invention. The step is to determine whether or not any uncompleted read request exists in the other storage devices with data related to the required data. If not or until no uncompleted read requests exists in the other storage devices with data related to the required data, the redundant data generating step is performed then. The method to generate redundant data in the present invention is by means of an XOR operation, reading mirror backup data or other equivalent means that can generate data identical to the required data. For the sake of conveniently describing the features of the present invention, disk drives are taken as the preferred storage device embodiment in the following description. However, it is not a limitation to the present invention and various storage devices may be taken as substitutions for the disk drive in light of practical applications.

Figure 2:
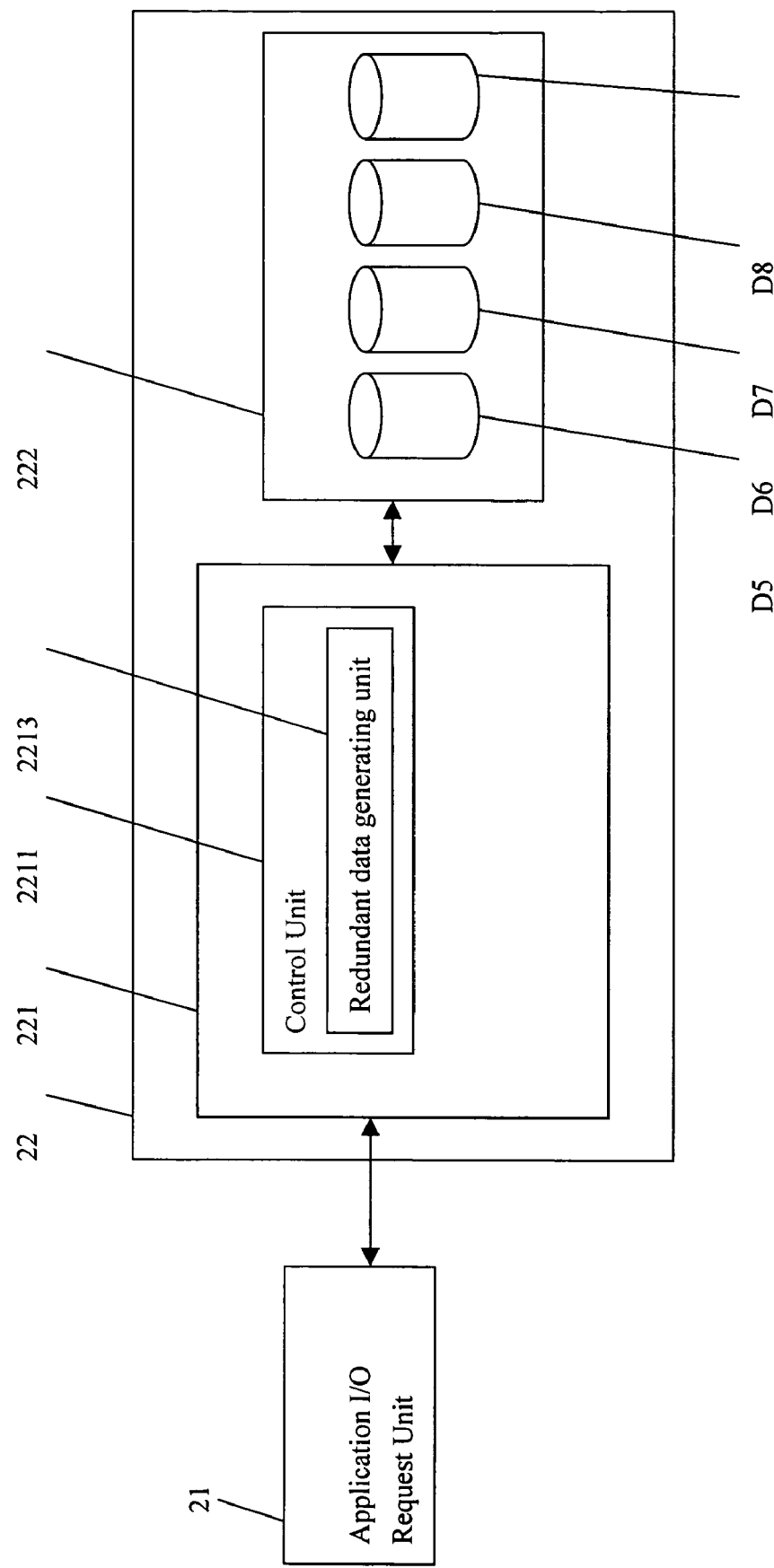
FIG. 2 is a schematic drawing of the system framework of the present invention.

FIG. 2 illustrates a schematic drawing of a system framework of an embodiment of the present invention. This system includes an application I/O request unit 21 and a storage subsystem 22. The application I/O request unit 21 can be a host or any other application apparatus that needs to read data in a storage system. The storage subsystem 22 includes a controller 221 and a storage device 222. The controller 221 further comprises a control unit 2211 that comprises a redundant data generating unit 2213. The storage device 222 includes a plurality of disk drives D5, D6, D7 and D8. In an embodiment of the present invention, the control unit 2211 further includes a plurality of queues Q5, Q6, Q7 and Q8 corresponding to the disk drives D5, D6, D7 and D8, respectively. These queues Q5, Q6, Q7 and Q8 are used to store the read requests temporarily not accepted by the disk drives D5, D6, D7 and D8. Of course, it is another embodiment that the queues Q5, Q6, Q7 and Q8 could be located in the disk drives D5, D6, D7 and D8.

When the application I/O request unit 21 is a host, the connection means with the storage subsystem 22 could be a storage area network (SAN), an Ethernet, a local area network (LAN), or some transmission interfaces including a serial ATA (SATA) interface, a fiber channel (FC), a small computer system interface (SCSI), or a PCI express interface. In some other embodiments, the application I/O request unit 21 can be a special integrated circuit (IC) or other equivalent devices that can send I/O read requests out to the controller 221 for reading data stored in the storage device 222 through the controller 221 according to requests or commands from another apparatus.

The controller 221 and the storage device 222 in the storage subsystem 22 can be enclosed in a single enclosure or separately in different ones. The controller 221 can be connected with the storage device 222 through some transmission interfaces of the type of a serial-attached SCSI, SCSI, SATA or Parallel ATA (PATA, or called IDE), etc. The type of the disk drives D5, D6, D7 and D8 in the storage device 222 can be various, such as the SCSI type, SATA type, PATA type or FC type, etc. The controller 221 can be a RAID controller or any other storage system controllers with the capability of generating redundant data; wherein the RAID technology generally includes RAID 1 to 6 and their extensions and combinations. In the present invention RAID6 means that multiple parity data is provided in the same redundant data group.

The redundant data generating unit 2213 in the control unit 2211 can generate (or regenerate) the redundant data identical to the required data. In this embodiment, taking RAID 4 technology as an example the redundant data is generated through an XOR operation calculated by the redundant data generating unit 2213. Of course, in other embodiments, other operation means could be adopted by the redundant data generating unit 2213 to generate the redundant data identical to the required data. Moreover, the redundant data generating unit 2213 can be designed outside the controller 2211 if necessary. The redundant data generating unit 2213 can be replaced by adopting other equivalent modules in other embodiments so as to generate the redundant data identical to the required data. In some embodiments, it is an alternative of reading the backup mirror data to generate the redundant data identical to the required data, and meanwhile the redundant data generating unit 2213 or its equivalent modules can be absent.

Figure 3A:
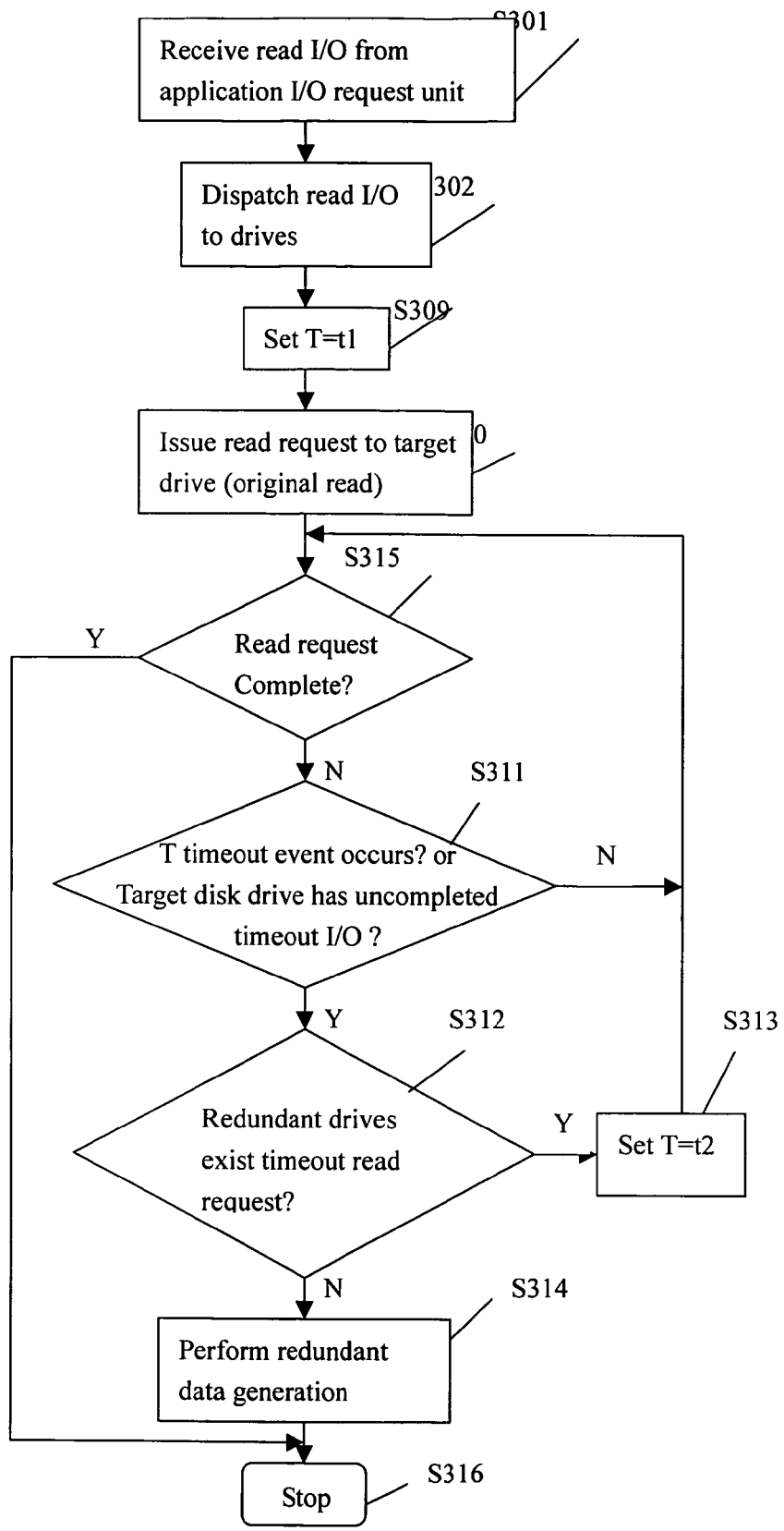
FIGS. 3A, 3B and 3C are the main flow charts of the present invention, respectively.
Figure 3B:
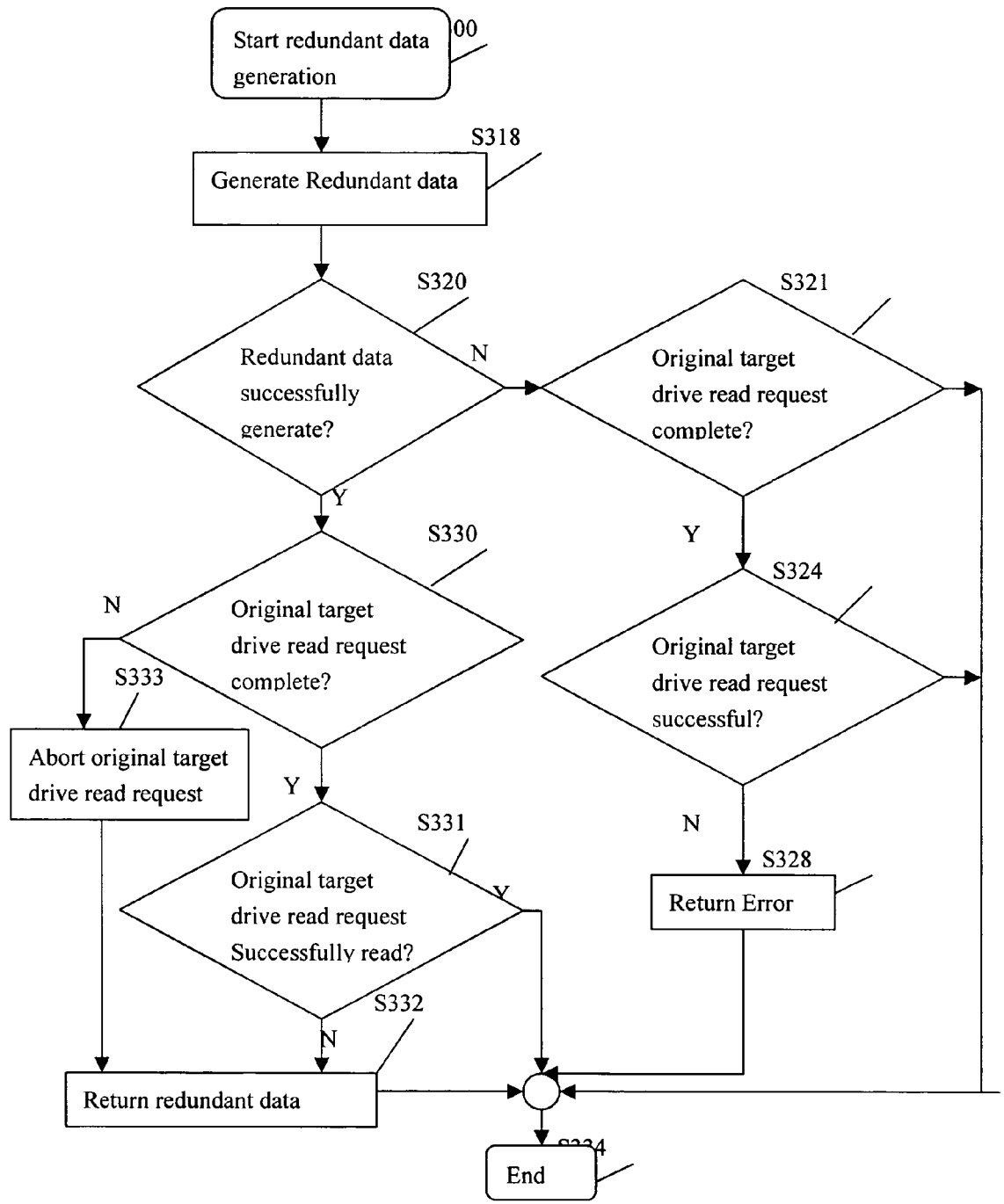
Figure 3C:
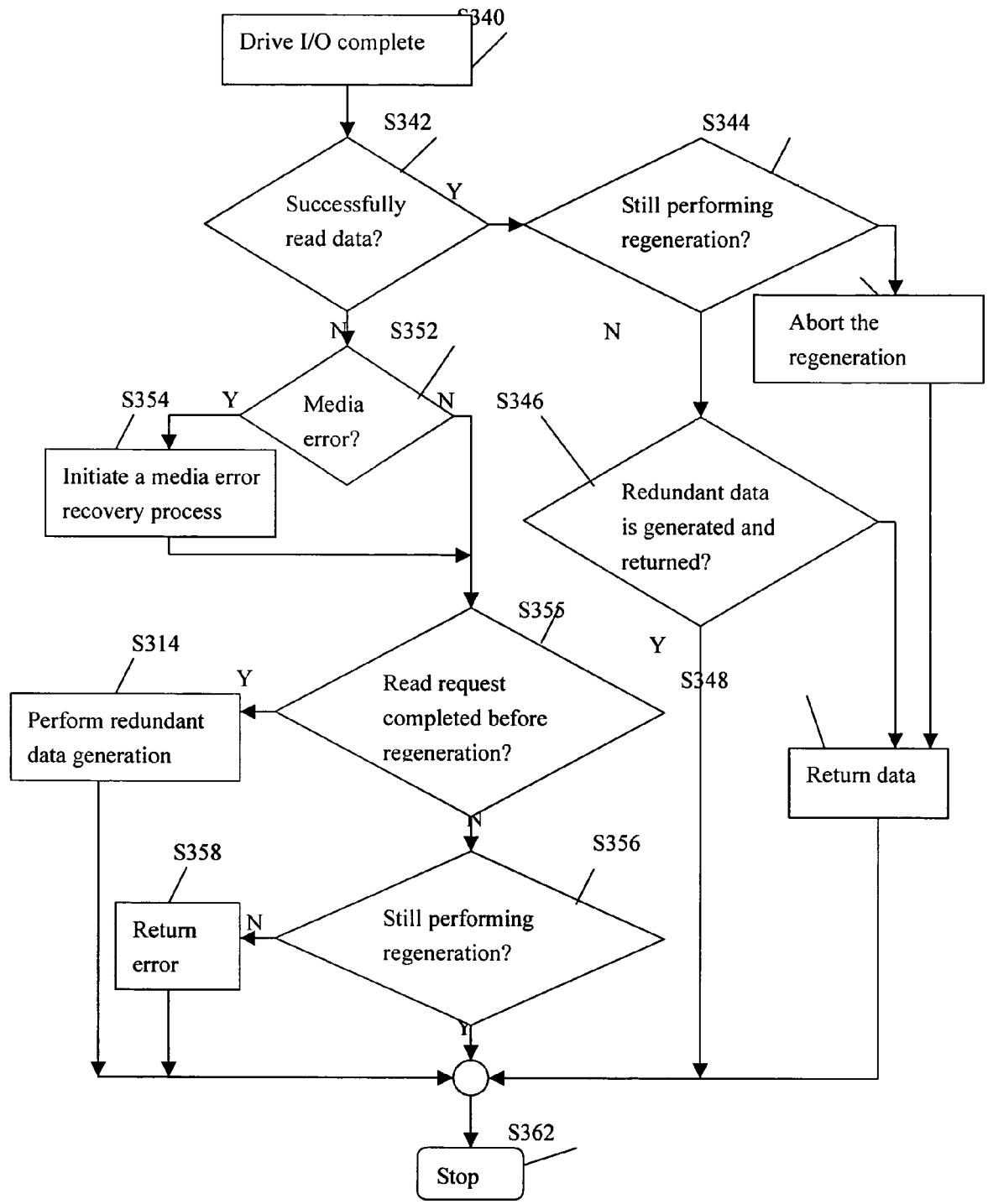

FIGS. 3A, 3B and 3C respectively illustrate the flow charts of a preferred embodiment of the present invention. Referring to FIGS. 3A to 3C and FIG. 2 together, when the application I/O request unit 21 sends out a read I/O request to the storage subsystem 22, the controller 221 in the storage subsystem 22 receives the read I/O request first in step S301. Then, the controller 221 processes the read I/O request to generate at least one read request for reading data in the corresponding target disk drive. In step S302, the read request is dispatched to at least one target disk drive of the disk drives D5, D6, D7 and D8 in the storage device 222 for reading data stored therein.

Next, in step S309, the controller 221 sets a first predetermined time period, such as 160 ms, and sends the read request to the target disk drive in step S310. In this embodiment, the predetermined time period can be dynamically modified according to the I/O state of the disk drive in real time, or can be a predetermined parameter. In this embodiment, when the controller 221 sends the read request to the target disk drive (or other disk drive other than the target disk drive), if the read request is not accepted due to some disk-side-characteristic reasons, the read request will be temporarily stored in a memory first to wait for being sent to the target disk drive in sequence when the target disk drive is free to accept the read request again. In other embodiments, different arrangement methods may be used to arrange the read requests in the memory. The disk-side-characteristic reasons might be, for example, some disk drives may be able to receive only one read I/O request at a time while accessing data, and, in this case, no more new read requests can be accepted while there is one existing and uncompleted. On the other hand, some target disk drives may be able to receive a plurality of read I/O requests, such as five requests, while accessing data. Similarly, if the target disk drive is already executing five I/O requests, it cannot accept any new read requests at the time. In this embodiment, the foregoing memory can be contained in the controller 221 (not shown in the figures). The queues Q5, Q6, Q7 and Q8 can be arranged in the spaces in the controller 221 for temporarily storing the read requests temporarily-not-accepted by the target disk drives. In another embodiment, the read request can be stored in the target storage device so as to wait for the moment that the storage device can perform the read request.

When the controller 221 sends out the read request, the controller 221 starts to count time toward the sent-out read request. If the read request cannot be completed in a first predetermined time period, such as 160 ms, then the process goes into the generation of the redundant data, and the controller 221 determines whether there is any uncompleted timeout read request existing in the target storage device or not after the sending of the read request, in steps S311 and S315. In the present invention, a timeout read request means a read request which has been issued for over a predetermined time period. The present invention may refer the phenomenon as a timeout event in the paragraphs hereinafter. If the target storage device has an uncompleted timeout read request and other storage devices containing data related to the generation of the redundant data have no uncompleted timeout read request, then the first predetermined time period will not be considered and the process directly goes into the generation of the redundant data, in other words, regarding this situation as a timeout event has already occurred. If the target disk drive completes the read request in the first predetermined time period, such as 160 ms, the controller 221 will stop counting time and start to trigger the steps shown in FIG. 3C. The detailed description will be shown in the following paragraphs with reference to FIG. 3C.

A conventional controller can only passively wait for the responses of the read data sent back from the disk drive. If the disk drive fails or cannot immediately send the read data back to the controller due to some reasons, the controller will do nothing but remain waiting, and it will reduce the efficiency of reading. Therefore, according to the present invention, if the read request has been sent to the target disk drive and the read request cannot be completed within a first predetermined time period, the redundant data will be generated right away. Moreover, if the target disk drive (or target storage device) already has one or more uncompleted timeout read requests, the new-coming read request will be definitely moved to one of the queues Q5, Q6, Q7 and Q8 first for waiting to be performed. In this situation it would be meaningless waiting for the first predetermined time period. Besides, as the disk drive cannot respond in a period of time, it will causes all I/O requests occurring in this period of time having to increase a timeout-waiting time. Therefore, in this embodiment, in order to improve the performance of reading, the first redundant data might be generated without waiting the first predetermined time period if there is an uncompleted timeout read request already existing in the target storage device. In this embodiment, the method used to generate the redundant data is an XOR operation as well as reading the corresponding data related to the required data.

Therefore, a determining step (S312) is performed beforehand to determine whether there are uncompleted timeout read requests existing in the other disk drives with data related to the required data. The data in the other disk drives can be read only when there are no uncompleted read requests therein, so the determining step (S312) should be performed before generating the redundant data, in order to avoid too many redundant read requests to be sent to the other disk drives by keeping the redundant read requests for generating the redundant data from being directly sent to the disk drives without any judgments, or it may reduce the reading efficiency of the storage subsystem. If there are any uncompleted timeout read requests remained in at least one of the other disk drives, a second predetermined time period, such as 50 ms, is set, and a determining step is activated to keep watching the other disk drives every second predetermined time period until no read requests existing in the other disk drives. Namely, the other disk drives are checked every 50 ms to see whether there are uncompleted timeout read requests existing in any of the disk drives. However, the read request sent to the target storage device is keeping going and being checked whether it is completed or not no matter in the first predetermined time period or the second predetermined time period. If the timeout read requests are not completed yet by the other disk drives and the original read request is also not completed by the target disk drive after 50 ms, the determining step will check the other disk drives and the target disk drive in another 50 ms until the timeout read requests are completed by the other disk drives or/and the original read request is completed by the target disk drive, in steps S313, S315, S311 and S312. If the timeout read requests are completed by the other disk drives in the second predetermined time period but the original read request is not completed by the target disk drive at that time, or there are no uncompleted timeout read requests existing in the other disk drives, a redundant data identical to the required data is then generated by the controller 221 in step S314. If the read request is completed by the target disk drive at the time that the other disk drives are still waiting for the completion of the timeout read requests, such as at the $40^{th}$ ms or the $70^{th}$ ms, the controller 221 will stop performing the step S314 for generating the redundant data identical to the required data. The controller 221 will perform the corresponding steps shown in FIG. 3C described in the following paragraphs. In some other embodiments, the second predetermined time period may not need to set; in other words, it is unnecessary to set a fixed second predetermined time period. The redundant data identical to the required data may be generated right after finding no uncompleted timeout read request existing in the other disk drives when the first predetermined time period is passed.

FIG. 3B illustrates the flow chart of the generation of redundant data according to the present invention. When the step S300 of starting redundant data generation is performed, the data related to the required data stored in the other storage devices (for example, the data stored in the same stripe with the required data) have to be acquired first and then the redundant data identical to the required data is generated by XOR operations, in step S318. There are a variety of means to acquire the data related to the required data. The most efficient one might be to check one or more caches first for reading the data related to the required data. If the data in the caches is enough to generate the redundant data, it would not necessary to read data from any other disk drives. However, if the current data in the caches is not enough to generate the redundant data identical to the required data, the lacking data related to the generation of the redundant data should be accessed from the corresponding disk drives. Of course, in other embodiments, the controller 221 may ignore the caches and directly send out read requests to the other disk drives other than the target disk drive for acquiring the data related to the generation of the redundant data. In the application of RAID5, if there is already one disk drive not able to response read requests (for example, the disk drive may be failed) and meanwhile another one has a timeout event occurring, the redundant data would not be able to be generated. If the RAID configuration is RAID6 or others with multiple parities, the controller 221 can just pick some disk drives for reading data and the amount of the picked disk drives is sufficient to provide the related data to generate the redundant data. If, unfortunately, one or more the picked disk drives have timeout events occurring at the time, the controller 221 can further send out read request(s) to one or more previous-not-picked disk drives for collecting enough data needed for the generation of the redundant data. Another possible practice for RAID6 or others with multiple parities again, the controller 221 may send out read requests to all disk drives other than the target disk drive, and the redundant data can be generated as long as enough data related to the generation of the redundant data returned from the other disk drives; the later-returned or unreturned data can be ignored in this practice.

After the step S318 is finished, the controller 221 determines whether or not the redundant data is successfully generated in step S320. If the redundant data is successfully generated, the controller 221 determines whether the read request previously sent to the target disk drive is completed or not in step S330. If the read request has been completed, the controller 221 further determines whether or not the read request has successfully read the required data in step S331. If the required data has been successfully read, the controller 221 will discard the generated redundant data and stop all the following related reading data operations in step S334. If the required data is not successfully read, the controller 221 will send back the generated redundant data to the application I/O request unit 21 in step S332.

If the read request sent to the target disk drive is not completed yet, the controller 221 will abort the read request in step S333; wherein the read request may be temporarily stored in queues arranged in a memory or stored in the target disk drive waiting for being performed or is being performed. However, in some embodiments, such as in some SATA disk drives, the read request that is being performed by the target disk drive cannot be aborted. Practically, the controller 221 will have to wait until the storage device completes the read request while using such kind of disk drives without supporting the aborting function. However, in some embodiments, such as in a SCSI disk drive, the read request being performed by the target disk drive can be interrupted. Then, the controller 221 sends back the generated redundant data identical to the required data to the application I/O request unit 21 in step S332.

If the controller 221 fails to generate redundant data due to reading errors or other causes, the controller 221 determines whether or not the original read request sent to the target disk drive has been completed in step S321. If the original read request has not been completed yet, the controller 221 will wait until the completion of the data reading of the original read request in step S334. If the original read request has been completed, the controller 221 further determines whether or not the original read request successfully reads the required data and sends the data to the application I/O request unit 21 in step S324. If the required data is successfully read and sent to the application I/O request unit 21, the data reading procedure ends in step S334. If the original read request has been completed but fails to read required data, the controller 221 may send an error message to the application I/O request unit 21 in step S328 and the data reading procedure ends in step S334.

During the period of the generation of the redundant data by the controller 221, the target disk drive could complete the original read request anytime. FIG. 3C is the flow chart illustrating the operations operated by the controller 221 when the read request is completed, in which the completion could be one of the following situations: successful reading data, driver failure or media errors. When the read request is completed in step S340, the controller 221 will determine whether or not the required data is successfully read in step S342.

When the required data is successfully read, a determining step is performed to determine whether the redundant data is already generated or not in step S344. If this redundant data is still in regeneration, the controller 221 will abort the regeneration of the redundant data in step S345 and sends the successfully-read data to the application I/O request unit 21 in step S348. On the other hand, if the controller 221 has generated the redundant data, the determination of whether the redundant data is successfully generated and sent to the application I/O request unit 21 is performed in step 346. If the redundant data is successfully generated and sent to the application I/O request unit 21, the controller 21 stops the procedure in step S362. If the redundant data is not successfully generated and is not sent to the application I/O request unit 21, the controller 21 sends the read data to the application I/O request unit 21 in step S348 and the data reading procedure stops in step S362.

If the completed read request does not successfully read required data, the controller 221 will determine whether or not the failure comes from a media error in step S352. If the failure comes from a media error, a determination of whether data is permitted to write into the media or not is performed then. If it is, a media error recovery process is started in step S354.

Next, the controller 221 determines whether the read request, which has been completed but unsuccessfully reads the required data, is in a timeout event or not, such as going beyond the first predetermined time period, and still in the regeneration process or not in steps S355 and S356. If it is, the controller 221 will keep waiting for the generation of the redundant data and stop the procedure in step S362. If the read request, which has been completed but unsuccessfully reads the required data, is in a timeout event and the generation of the redundant data is failed as well, an error message is returned to the application I/O request unit 21 in step S358, and then the process stops in step S362.

As described in the foregoing, if the read request is successfully completed in the first predetermined time period but fails to read the required data, the controller 221 starts to generate the redundant data in step S314. The detailed description of the regeneration is illustrated by the flowchart of FIG. 3B.

Figure 3D:
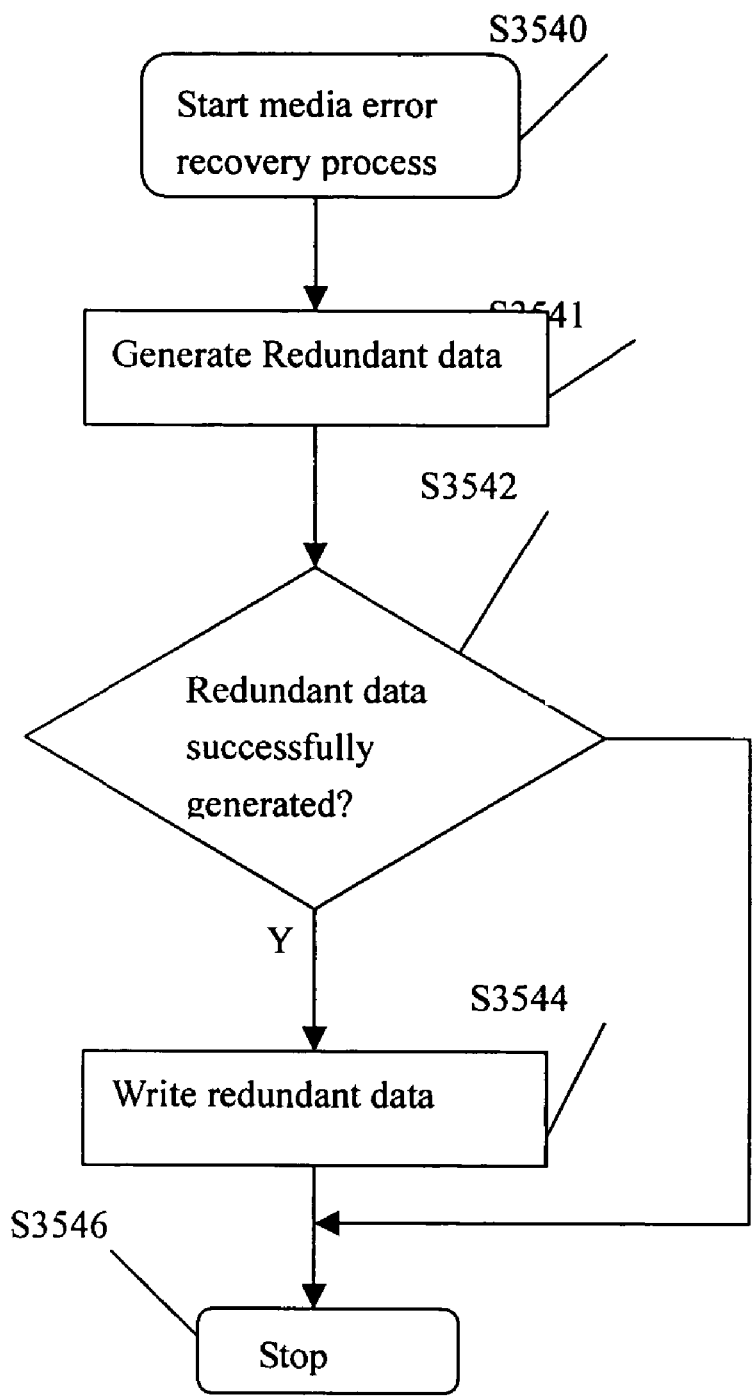
FIG. 3D is the flow chart of the media error recovery procedure of the present invention.

FIG. 3D illustrates a flow chart of the media error recovery process starting in step S3540. First, the controller 221 generates the redundant data identical to the required data in step S3541. Then, a determining step is performed to determine whether or not the redundant data is successfully generated in step S3542. If the redundant data is successfully generated, this data is written into the address of the required data for protecting the data in step S3544, and the media error recovery process stops in step S3546. If the redundant data is not successfully generated, the media error recovery process stops in step S3546.

The steps in FIG. 3C is related to the steps in FIGS. 3A and 3B, and there are mutual influences with each other. In short, after the controller 221 sends out a read request and the first predetermined time period is passed, the redundant data identical to the required data is generated by the redundant data generation steps, referring to FIGS. 3A and 3B for the details. In the meantime, the controller 221 keeps waiting for the completion of the read request sent to the target storage device in order to sent back the required data to the application I/O request unit 21, referring to FIG. 3C for details. If the redundant data identical to the required data is successfully generated by the controller 221 but the read request is not successfully completed yet by the target disk drive, the redundant data will be sent back to the application I/O request unit 21. If the read request is completed and successfully read the required data by the target disk drive but the redundant data is not successfully generated by the controller 221 after the first predetermined time period, the controller 221 will return the required data successfully read by the target disk drive. Therefore, the controller 221 will return the required data to the application I/O request unit 21 depending on which processes described above are finished and return the data first. Then, the uncompleted one will be aborted or stopped.

The following examples illustrate some situations frequently encountered when the present invention is performed. However, there are some other situations which would be encountered when the present invention is performed by those embodiments. FIGS. 3A to 3C are the reference as well while describing the embodiments.

Figure 4:
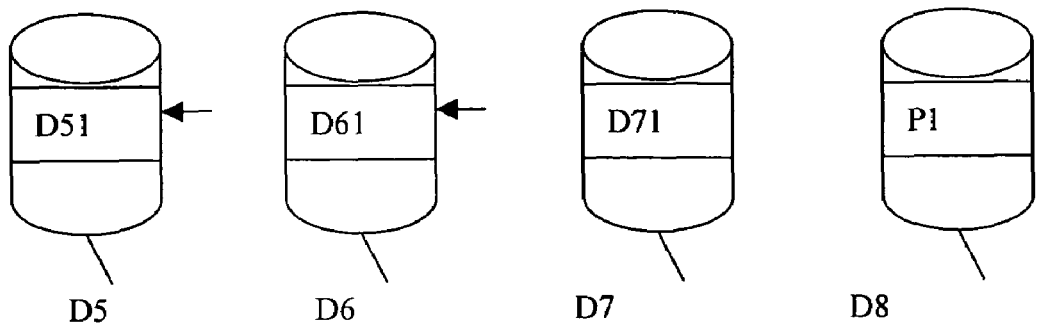
FIG. 4 is a schematic drawing according to the first example of the present invention.

FIGS. 2, 3A, 3C and 4 describe the first example of the present invention. FIG. 4 is a schematic drawing of the first example, which discloses a normal reading situation in the target disk drive. When the application I/O request unit 21 sends out a read request for reading data of 32 KB to the storage subsystem 22, the controller 221 receives the read request and generate a first read request and a second read request to separately read data D51 and D61 each of 16 KB respectively stored in the target disk drives D5 and D6 in steps S301 and S302. Next, the controller 221 sets a first predetermined time period, such as 160 ms, and sends the first and second read requests separately to the queues Q5 and Q6 corresponding to the target disk drives D5 and D6. In this example, supposed that there are no uncompleted read requests existing in the drives D5 and D6 and no waiting read requests remaining in the queues Q5 and Q6, therefore, the first and the second read requests sent to the queues Q5 and Q6 are instantly performed by the target disk drives D5 and D6 in the steps S309 and S310.

After the controller 221 sends out the read requests to the target disk drives D5 and D6 in this example (the read requests may stored in the queues Q5 and Q6 first for a while), the process time of the first read request and the second read request starts to be counted by the controller 221 respectively for determining whether or not the read requests can be completed in 160 ms. In this example, the first read request and the second read request are both completed in 160 ms in step S340, and the data D51 and D61 are successfully read by the disk drives D5 and D6 and sent back to the controller 221. Next, the controller 221 performs the steps S342, S344, S346 and S348 to return the read data to the application I/O request unit 21. In this example, because no interrupt situation occurs and no redundant data is generated by the controller 21, the data read from the disk drives D5 and D6 are sent to the application I/O request unit 21 by the controller 221 to finish the data reading process.

Figure 5:
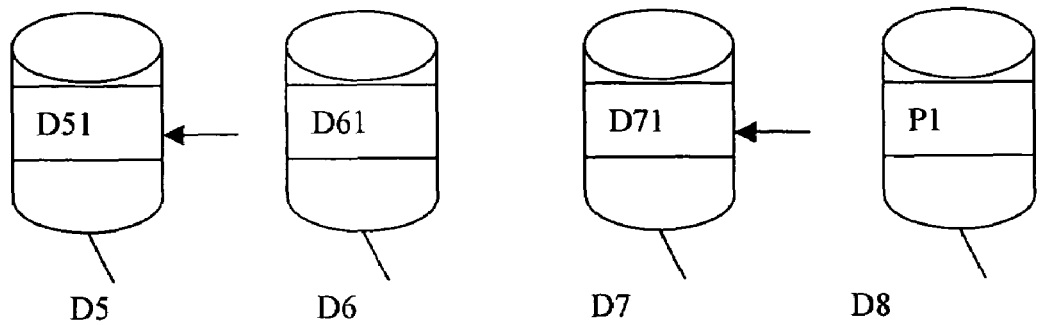
FIG. 5 is a schematic drawing according to the second example of the present invention.

FIGS. 2, 3A, 3B and 5 describe the second example of the present invention. FIG. 5 is a schematic drawing of the second example, which discloses the situation that the redundant data identical to the required data is generated while the read request is not completed yet within a predetermined time period after the request is sent to a target disk drive. The process of the second example is similar to the one of the first example. The difference is the controller 221 generates and sends a first read request and a second read request to the target disk drives D5 and D7 for reading the data D51 and D71 respectively. In this example, the drive D5 completes the first read request process and successfully reads the data D51 within the first predetermined time period, e.g. 160 ms. However, the drive D7 fails to complete the second read request process for reading the data D71 within 160 ms. The reasons of failure could be slower reading speed of the drive D7, damage blocks the data D71 located, failure of the drive D7 itself, unplugging of the drive D7, or a previous uncompleted timeout read request already exists in the drive D7 to make the second read request remain stored and waiting in the queue Q7.

Based on the case in the foregoing, the controller 221 starts generating redundant data identical to the required data D71 when the second read request pasts the first predetermined time limit. However, the second read request process is still ongoing according to a set schedule. For example, if the second read request is already performed by the target disk drive D7, the second read request will not be stopped even if the controller 221 starts generating the redundant data due to the slower reading speed of the disk drive D7. Or, the second read request already staying in the queue Q7 will remain stored therein and waiting for being performed by the target disk drive D7 when the target disk drive D7 is free.

Before the generation of the redundant data by the controller 221, a determining step is performed in advance to determine whether there are any uncompleted timeout read requests in the drives D5, D6 and D7, respectively, containing data related to data D71, in step S312. In this example, XOR operations based on RAID3 to RAID5 are used to generate the redundant data. Of course, in other embodiments of the present invention some other algorithms other than RAID3 to RAID 5 may be used only if the storage devices have mutual redundant relationships and can provide data identical to the required data through other workable devices if one or more fail. In this example, there are no uncompleted timeout read requests remaining in drives D5, D6 and D8, so the controller 221 starts to read the user data D51 and D61 and the parity data P1 all located on the same stripe as the data D71 is.

After the reading of the user data D51 and D61 and the parity data P1 by the controller 221, an XOR operation is performed on these data by the redundant data generating unit 2213. Because the data D71, the user data D51 and D61 and the parity data P1 are all located on the same stripe, the equations apply as followings.

P1□D51□D61□D71

D71□P1□D51□D61

In step S318, the controller 221 applies XOR operation on the user data D51 and D61 and the parity data P1 to come out the redundant data identical to the data D71 by the redundant data generating unit 2213. In some embodiments, the data D51 may be temporarily stored in a cache because the data D51 has been successfully read previously. Therefore, it is not necessary to repeat reading the data D51 from the disk drive D5 while generating redundant data. The data D51 can be obtained from the cache directly.

As described in the foregoing, when the controller 221 starts generating the redundant data, it is possible for the disk drive D7 to complete the second read request before the controller 221 completely generates the redundant data if the second read request is continuously performed by the target drive D7. In this case, the controller 221 directly returns the successfully-read data to the application I/O request unit 21 and stops the generation process for the redundant data. However, it is also possible that the disk drive D7 fails and return no responses. In this example, the situation is the redundant data is successfully generated while the disk drive D7 does not return the read data D71 yet. Therefore, the controller 221 returns the generated redundant data to the application I/O request unit 21. Because the required data has been returned to the application PO request unit 21, the read data will be cancelled when the target disk drive D7 successfully reads the data. However, if the data involves a media error, a media error recovery process is performed to rewrite correct data in order to safeguard the data.

Figure 6:
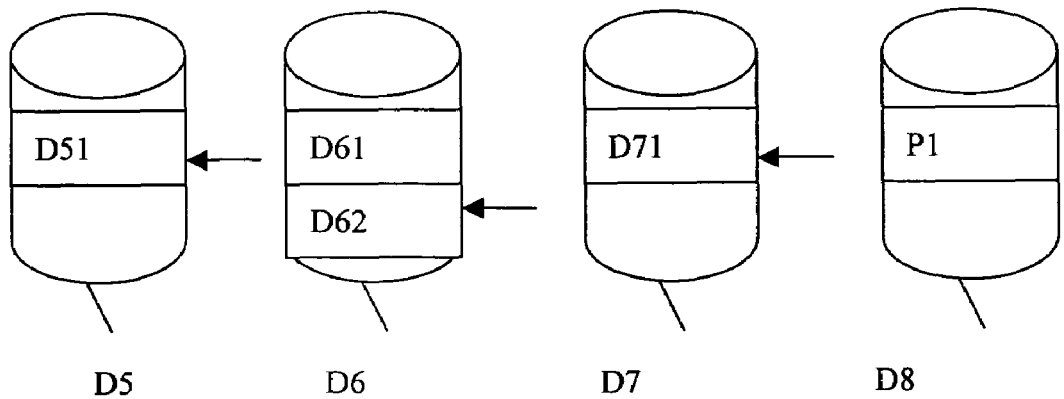
FIG. 6 is a schematic drawing according to the third example of the present invention.

FIGS. 2, 3A~3C and 6 describe the third example of the present invention; wherein FIG. 6 is a schematic drawing of the third example of the present invention. This example discloses the situation determining whether there are any uncompleted timeout read requests existing in other disk drives when the target disk drive returns no responses after a predetermined time period and before the generation of the redundant data by the controller 221. The process of this example is similar to the one of the second example. The difference is that a determining step is performed before the controller 221 generates the redundant data, which determines whether any uncompleted timeout read requests exist in disk drives D5, D6 and D8 in step S312. In this example, there is an uncompleted timeout read request existing in the disk drive D6 for reading the data D62. Therefore, the controller 221 sets a second predetermined time period, such as 50 ms, for example, and stays waiting for checking whether the disk drive D6 can complete the read request and the target disk drive D7 can complete the second read request in 50 ms. If the disk drive D6 cannot complete the timeout read request in 50 ms and the target drive D7 cannot complete the second read request in 50 ms as well, the controller 221 will keeps waiting for another 50 ms until at least one of the disk drives D6 and D7 complete its read request, in steps S311, S312, S313 and S315.

When there is no uncompleted timeout read request in the disk drives D5, D6 and D8, the controller 221 starts reading the user data D51 and D61 and the parity data P1 related to the data D71. The redundant data generating process is similar to the foregoing examples. If the target disk drive D7 completes the read request and successfully reads the required data D71 while the generation of the redundant data is still performing by the controller 221, the controller 221 will then perform the steps S342, S344, S346 and S348 in order to return the required data D71, which is successfully read from the target disk drive D7, to the application I/O request unit 21. In other examples, if the generation of the redundant data is completed right after the target disk drive D7 successfully reads the data D71, the controller 221 will return the read data D71 to the application I/O request unit 21 and cancels the redundant data.

However, as described in the foregoing, the controller 221 starts to generate the redundant data identical to the required data after the first predetermined time period at least. If the controller 221 successfully generates the redundant data identical to the required D71 but the read request in the target disk drive D7 is not completed yet, the controller 221 will abort the read request and returns the redundant data to the application I/O request unit 21, in steps S333 and S332.

Figure 7:
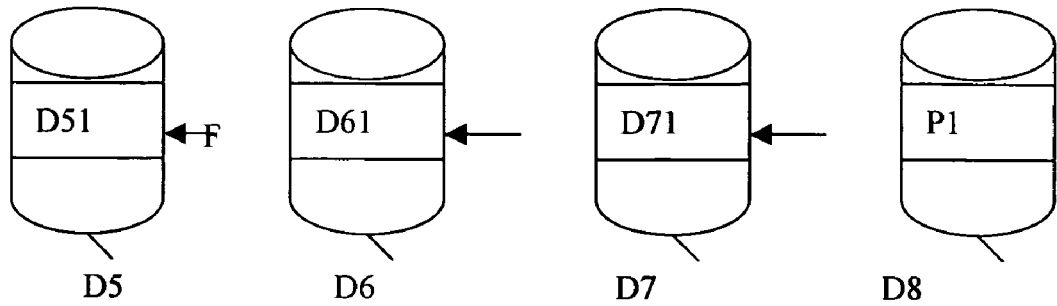
FIG. 7 is a schematic drawing according to the fourth example of the present invention.

FIGS. 2, 3A~3C and 7 describe the fourth example of the present invention; wherein FIG. 7 is a schematic drawing of the fourth example of the present invention. This example discloses the situation that the controller 221 cannot successfully generate the redundant data. Similarly, when the application I/O request unit 21 sends out a read I/O request to the subsystem 22, the controller 221 transforms the read I/O request into at least one read request in step S302. In this example, the read I/O request sent out by the application I/O request unit 21 is transformed into a first read request and a second read request by the controller 221, in order to send the first and the second read requests to the target disk drives D6 and D7 respectively. Next, the controller 221 sets a first predetermined time period, such as 160 ms, for example, and sends the first and the second read requests to the target drives D6 and D7 in order to read data D61 and D71 respectively, in steps S301, S302, S309 and S310.

Then, the controller 221 starts to count the processing time of the first and the second read requests separately after sending out the first and the second read requests to the disk drives D6 and D7 respectively, for determining whether or not these read request processes can be completed within 160 ms, in steps S311 and S315. In this example, situation is that the first read request is completed in 160 ms with the successfully-read data D6 1, while the second read request is not completed yet 160 ms later by the target drive D7.

Therefore, the redundant data identical to the required data D71 is generated by the controller 221 thereafter. In this example, no uncompleted read requests exist in the other disk drives so, the controller starts to read the data D51 and D61 and the parity data P1 related to the data D71. However, in this example, the disk drive D5 fails when reading the data D5 1. Therefore, the controller 221 cannot successfully generate the redundant data identical to the data D71 just through the data D61 and the parity data P1, in steps S318 and S320. Hence, the controller 221 determines whether the original read request sent to the target disk drive D7 is completed or not, in step S321. If the original read request (namely, the second read request) is not completed yet, the controller 221 will stop the generation of the redundant data in step S334 and waits for the completion of the second read request in step S340. If the second read request sent to the target drive D7 is completed, the controller 221 determines whether the second read request successfully reads the data or not in step S324. If the second read request does not successfully read the required data, the controller 221 returns an error message to the application I/O request unit 21 in step S328. If the second read request successfully reads the required data, the controller 221 ends the data reading process, in step S334.

Figure 8:
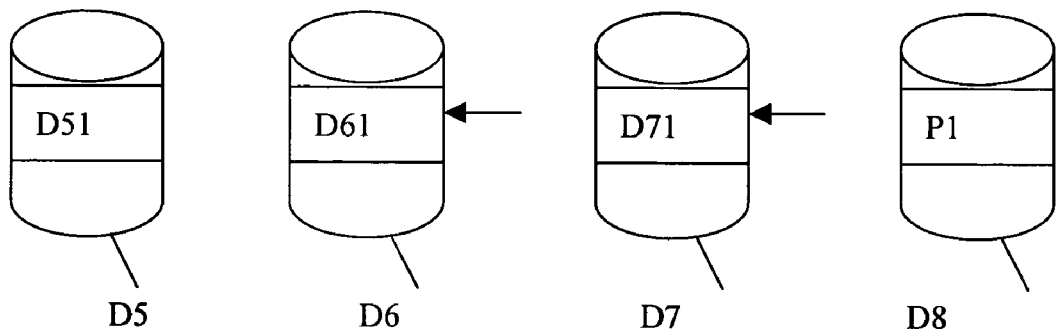
FIG. 8 is a schematic drawing according to the fifth example of the present invention.

FIGS. 2, 3A~3C and 8 describe the fifth example of the present invention; wherein FIG. 8 is a schematic drawing of the fifth example of the present invention. This example discloses the case that two read requests are not completed after a certain time period, such as the first predetermined time period. In this example, the read I/O request sent out by the application I/O request unit 21 is transformed into a first read request and a second read request separately for reading the data D61 and D71 respectively. Then, the two read requests are sent to the target disk drives D6 and D7, in steps S301, S302, S309 and S310.

However, the first and the second read requests are still uncompleted after the first predetermined time period, such as 160 ms, for example. The controller 221 performs the step S312 to determine whether or not any uncompleted timeout read requests exist in other disk drives that have a redundant relationship with the target disk drive. For example, for the target disk drive D6, the drives D5, D7 and D8 are examined to determine whether or not they have any uncompleted timeout read requests, while the drives D5, D6 and D8 are examined in the same way if the target disk drive is D7. In this example, the target drive D7 completes the second read request at the $200^{th}$ ms. If the target drive D6 cannot complete the read request in 210 ms, a redundant data identical to the data D61 is then generated, as shown in FIG. 3B.

Therefore, even though there are two target drivers cannot complete the read requests within the first predetermined time period, the controller 221 respectively determines whether or not any uncompleted timeout read requests exist in other disk drives related to the target drive. When there are no uncompleted timeout read requests existing in other drives, the redundant data identical to the required data is generated.

Figure 9:
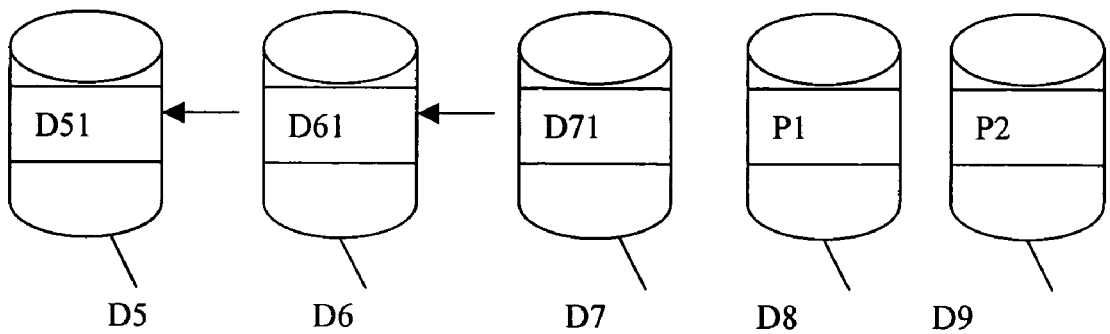
FIG. 9 is a schematic drawing according to the sixth example of the present invention.

FIGS. 2, 3A~3C and 9 describe the sixth example of the present invention; wherein FIG. 9 is a schematic drawing of the sixth example of the present invention. This example discloses the redundant data calculation by the controller 221 when the RAID system has two parity disk drives D8, and D9. Basically, the operations in this example are similar to the ones described above. However, the major difference is there are two parity disk drives D8, and D9 involved in the RAID system, such as a RAID6 system, in this example. Accordingly, the controller 221 can generate the redundant data by just picking enough and needed-to-read disk drives for reading data. Or, the controller 221 can issue read requests to all disk drives other than the unresponsive one and the redundant data can be generated as long as enough data related to the generation of the redundant data returned; unnecessary to wait for all data returned from all other disk drives. For example, the read I/O request sent out by the application I/O request unit 21 is transformed into a first read request and a second read request separately for reading the data D51 and D61 respectively. Then, the two read requests are respectively sent to the target disk drives D5 and D6, in steps S301, S302, S309 and S310. When the first predetermined time period, such as 160 ms, is passed, the first read request is completed but the second read request is not yet. Then the controller 221 determines whether there is any uncompleted timeout read request existing in the other storage devices containing data related the regeneration of data D61 and needed to read, in step S312. In this example, as long as when any three of the four disk drives D5, D7, D8, and D9 have no uncompleted timeout read request, the redundant data generation process of step S314 can be done right away, in order to generate the redundant data identical to the data D61: If the disk drives D5, D7, D8, and D9 all have no uncompleted timeout read request, the controller 221 may pick disk drives D5, D7, and D8 to issue read requests for acquiring data D51, D71, and P1 to generate the redundant data identical to the data D61. If, unfortunately, in the process of generation of the redundant data finding that the disk drive D5 turns into the situation of a timeout event, the controller 221 can further issue a read request to the disk drive D9 for gathering enough needed data D71, P1, and P2 for the generation of the redundant data. Another practice is that the controller 221 can issue read requests to all disk drives D5, D7, D8, and D9 other than the unresponsive disk drive D6. If the disk drives D5, D7, and D8 have successfully returned the data D51, D71, and P1, the controller 221 can directly go into the process of the generation of the redundant data without concerning the late-returned data P2 from the disk drive D9.

Considering the existence of a cache, the same situation, if the disk drive D6 returns no response after the first predetermined time period, the controller 221 will check the cache first to see whether there are enough data to generate the redundant data identical to the data D61 before the generation of the redundant data. If the cache happens to have data D51, D71, and P1 at the time, the controller 221 needn't read any thing from the disk drives but can directly go into the process of the generation of the redundant data. If the cache only has the data D51, the controller 221 needs to issue read requests to all or any two of the three disk drives D7, D8, and D9 in order to acquire enough related data to generate the redundant data.

According to the foregoing description of the present invention, the redundant data identical to the required data is generated after the read request is sent to the storage device for a while. Moreover, if the required data is successfully read during generation of the redundant data, the successfully-read data will be sent to the application I/O request unit 21. If the redundant data has been generated before the target disk drive successfully reads the required data, the generated redundant data will be sent to the application I/O request unit 21. If the redundant data has been generated, the controller 221 will abort the read request and sends this redundant data to the application I/O request unit 21.

As is understood by a person skilled in the art, the foregoing descriptions of the preferred embodiments of the present invention are illustrations of the present invention rather than a limitation thereof. Various modifications and similar arrangements are included within the spirit and scope of the appended claims. The scope of the claims should be accorded to the broadest interpretation so as to encompass all such modifications and similar structures. While preferred embodiments of the invention have been illustrated and described, it will be appreciated that various changes can be made therein without departing from the spirit and scope of the invention.

What is claimed is:

1. A method for improving data reading performance, comprising:
    sending a first read request for reading first data stored in a target storage device;
    determining whether the first read request is completed in a first predetermined time period or not;
    generating first redundant data identical to the first data if the first read request is not completed in the first predetermined time period; and
    returning the first redundant data to a request unit if the generation of the first redundant data is completed and successful while the reading process of the first data is not finished yet, or returning the first data to the request unit if the first read request successfully reads the first data before the generation of the first redundant data is completed.

2. The method according to claim 1, wherein the determining step further determines whether there is an uncompleted timeout read request existing in the target storage device or not, and the first redundant data will be generated without waiting the first predetermined time period if there is an uncompleted timeout read request already existing in the target storage device.

3. The method according to claim 1, wherein further comprising a step of determining, before the generation of the first redundant data, whether there is an uncompleted timeout read request existing in other storage devices which contain data related to the regeneration of the first data and needed to be read, and if there is an uncompleted timeout read request existing in the other storage devices, repeating waiting for a second predetermined time period until no uncompleted timeout read request exists in the other related storage devices; and generating the first redundant data when there is no uncompleted timeout read request in the other related storage devices.

4. The method according to claim 3, wherein the first data is returned to the request unit if the first read request is completed and successfully reads the first data while the other storage devices still have an uncompleted timeout read request waiting to be completed.

5. The method according to claim 1, wherein further comprising the step of checking, before generating the first redundant data, at least one cache to see whether the data stored therein is enough to regenerate the first data or not, and if the data stored therein is not enough to regenerate the first data, reading lacking data for the generation of the first redundant data from at least one storage device.

6. The method according to claim 1, wherein if the first redundant data is successfully generated while the first read request is not completed yet, the first read request is aborted.

7. The method according to claim 1, wherein the generation of the first redundant data is cancelled if the first read request has successfully read the first data while the first redundant data is not generated yet.

8. The method according to claim 1, wherein further comprising the steps of:
    determining whether the first read request is completed or not if the first redundant data cannot be generated;
    waiting for the first read request to be completed if the first read request is not completed yet; and
    returning an error message to the request unit if the first read request is completed but dose not successfully read the first data.

9. The method according to claim 1, wherein a media error recovery process is initiated if the first read request is completed but does not successfully read the first data due to a media error.

10. The method according to claim 1, wherein if the first read request is completed after the first predetermined time period but does not successfully read the first data and meanwhile the first redundant data is being generated, then waiting for the generation of the first redundant data to be completed.

11. The method according to claim 1, wherein if the first read request is completed after the first predetermined time period but does not successfully read said first data and meanwhile the first redundant data is not being generated, an error message is returned to the request unit.

12. A method for improving data reading performance, which is applied in a RAID system with multi-parity, comprising:
    sending a first read request for reading first data stored in a target storage device;
    determining whether the first read request is completed in a first predetermined time period or not; and
    generating first redundant data identical to the first data for being selectively returned to a request unit if the first read request is not completed in the first predetermined time period;
    wherein, the RAID system has multi-parity such that not all of the related data in related storage devices other than the target storage device are required when generating the first redundant data.

13. The method according to claim 12, wherein the determining step further determines whether there is an uncompleted timeout read request existing in the target storage device or not, and the first redundant data will be generated without waiting the first predetermined time period if there is an uncompleted timeout read request already existing in the target storage device.

14. The method according to claim 12, wherein further comprising a step of determining, before the generation of the first redundant data, whether there is an uncompleted timeout read request existing in other storage devices which contain data related to the regeneration of the first data and needed to be read, and if there is an uncompleted timeout read request existing in the other storage devices, repeating waiting for a second predetermined time period until no uncompleted timeout read request exists in the other related storage devices; and generating the first redundant data when there is no uncompleted timeout read request in the other related storage devices.

15. The method according to claim 12, wherein further comprising a step of returning the first redundant data to the request unit if the generation of the first redundant data is completed and successful while the reading process of the first data is not finished yet, or returning the first data to the request unit if the first read request successfully reads the first data before the generation of the first redundant data is completed.

16. The method according to claim 12, wherein further comprising the step of checking, before generating the first redundant data, at least one cache to see whether the data stored therein is enough to regenerate the first data or not, and if the data stored therein is not enough to regenerate the first data, reading the lack data for the generation of the first redundant data from at least one storage device.

17. The method according to claim 15, wherein if the first redundant data is successfully generated while the first read request is not completed yet, the first read request is aborted.

18. The method according to claim 15, wherein the generation of the first redundant data is cancelled if the first read request has successfully read the first data while the first redundant data is not generated yet.

19. The method according to claim 12, wherein further comprising the steps of:
determining whether the first read request is completed or not if the first redundant data cannot be generated;
waiting for the first read request to be completed if the first read request is not completed yet; and
returning an error message to the request unit if the first read request is completed but dose not successfully read the first data.

20. The method according to claim 12, wherein a media error recovery process is initiated if the first read request is completed but does not successfully read the first data due to a media error.

21. The method according to claim 12, wherein if the first read request is completed after the first predetermined time period but does not successfully read the first data and meanwhile the first redundant data is being generated, then waiting for the generation of the first redundant data to be completed.

22. The method according to claim 12, wherein if the first read request is completed after the first predetermined time period but does not successfully read said first data and meanwhile the first redundant data is not being generated, an error message is returned to the request unit.

23. A method for improving data reading performance, comprising:
sending a first read request for reading first data stored in a target storage device;
determining whether the first read request is completed in a first predetermined time period or not;
determining whether there is an uncompleted timeout read request existing in other storage devices which contain data related to the regeneration of the first data and needed to be read if the first read request is not completed in the first predetermined time period; and
generating first redundant data identical to the first data after waiting until no uncompleted timeout read request exists in the other storage devices if there is an uncompleted timeout read request existing in the other storage devices, or generating the first redundant data identical to the first data without waiting if there is no uncompleted timeout read request existing in the other storage devices, the first redundant data being generated for being selectively returned to a request unit.

24. The method according to claim 23, wherein the first determining step further determines whether there is an uncompleted timeout read request existing in the target storage device or not, and the first redundant data will be generated without waiting the first predetermined time period if there is an uncompleted timeout read request already existing in the target storage device.

25. The method according to claim 23, wherein if there is an uncompleted timeout read request existing in the other storage devices, a second predetermined time period is being repeating waiting until no uncompleted timeout read request exists in the other storage devices, and generating the first redundant data when there is no uncompleted timeout read request in the other related storage devices.

26. The method according to claim 23, wherein further comprising a step of returning the first redundant data to the request unit if the generation of the first redundant data is completed and successful while the reading process of the first data is not finished yet, or returning the first data to the request unit if the first read request successfully reads the first data before the generation of the first redundant data is completed.

27. The method according to claim 23, wherein further comprising the step of checking, before generating the first redundant data, at least one cache to see whether the data stored therein is enough to regenerate the first data or not, and if the data stored therein is not enough to regenerate the first data, reading the lack data for the generation of the first redundant data from at least one storage device.

28. The method according to claim 23, wherein if the first redundant data is successfully generated while the first read request is not completed yet, the first read request is aborted.

29. The method according to claim 23, wherein further comprising the steps of:
determining whether the first read request is completed or not if the first redundant data cannot be generated;
waiting for the first read request to be completed if the first read request is not completed yet; and
returning an error message to the request unit if the first read request is completed but dose not successfully read the first data.

30. The method according to claim 23, wherein a media error recovery process is initiated if the first read request is completed but does not successfully read the first data due to a media error.

31. The method according to claim 23, wherein if the first read request is completed after the first predetermined time period but does not successfully read said first data and meanwhile the first redundant data is not being generated, an error message is returned to the request unit.

32. A storage system comprising a controller connected with a request unit and a plurality of storage devices, the controller being capable of sending out a first read request to a target storage device storing first data according to a read request from the request unit; the controller comprising a redundant data generation unit which generates first redundant data identical to the first data if the first read request is not completed in a first predetermined time period, and meanwhile the first read request keeps reading the first data; the controller returns either the first redundant data or the first data which is finished first and successful.

33. The storage system according to claim 32, wherein the controller further determines whether there is an uncompleted timeout read request existing in the target storage device or not after sending out the first read request to the target storage device, and the first redundant data will be generated without waiting the first predetermined time period if there is an uncompleted timeout read request already existing in the target storage device.

34. The storage system according to claim 32, wherein the controller further determines whether there is an uncompleted timeout read request existing in other storage devices which contain data related to the regeneration of the first data and needed to be read before the generation of the first redundant data, and a second predetermined time period is being repeating waiting by the controller until no uncompleted timeout read request existing in the other storage devices and generating the first redundant data when there is no uncompleted timeout read request in the other related storage devices.

35. The storage system according to claim 34, wherein the first data is returned to the request unit if the first read request is completed and successfully reads the first data while the other storage devices still have an uncompleted timeout read request waiting to be completed.

36. The storage system according to claim 32, wherein the controller further checks, before generating the first redundant data, at least one cache to see whether the data stored therein is enough to regenerate the first data or not, and if the data stored therein is not enough to regenerate the first data, the controller will read the lack data for the generation of the first redundant data from at least one storage device.

37. The storage system according to claim 32, wherein the controller aborts the first read request if the first redundant data is successfully generated while the first read request is not completed yet.

38. The storage system according to claim 32, wherein the controller stops the generation of the first redundant data if the first read request has successfully read the first data while the first redundant data is not generated yet.

39. The storage system according to claim 32, wherein the controller further determines whether the first read request is completed or not if the first redundant data cannot be generated, waits for the first read request to be completed if the first read request is not completed yet, and returns an error message to the request unit if the first read request is completed but dose not successfully read the first data.

40. The storage system according to claim 32, wherein the controller initiates a media error recovery process if the first read request is completed but does not successfully read the first data due to a media error.

41. The storage system according to claim 32, wherein if the first read request is completed but does not successfully read the first data after the first predetermined time period and meanwhile the first redundant data is being generated, then the controller waits for the generation of the first redundant data to be completed.

42. The storage system according to claim 32, wherein if the first read request is completed after the first predetermined time period but does not successfully read said first data and meanwhile the first redundant data is not being generated, an error message is returned to the request unit by the controller.

* * * * *